United States Patent
Haynes et al.

(10) Patent No.: US 7,913,947 B2
(45) Date of Patent: Mar. 29, 2011

(54) COMPACT TILTROTOR PYLON-CONVERSION ACTUATION SYSTEM

(75) Inventors: David F. Haynes, Arlington, TX (US); Andrew D. Smith, Arlington, TX (US)

(73) Assignee: Textron Innovations Inc., Providence, RI (US)

( * ) Notice: Subject to any disclaimer, the term of this patent is extended or adjusted under 35 U.S.C. 154(b) by 108 days.

(21) Appl. No.: 11/662,556

(22) PCT Filed: Sep. 30, 2004

(86) PCT No.: PCT/US2004/032137
§ 371 (c)(1), (2), (4) Date: Mar. 12, 2007

(87) PCT Pub. No.: WO2006/041455
PCT Pub. Date: Apr. 20, 2006

(65) Prior Publication Data
US 2007/0241228 A1    Oct. 18, 2007

(51) Int. Cl.
*B64D 27/00* (2006.01)
(52) U.S. Cl. .......................... 244/56; 244/12.4
(58) Field of Classification Search .............. 244/10, 244/12.4, 56
See application file for complete search history.

(56) References Cited

U.S. PATENT DOCUMENTS

| | | | | |
|---|---|---|---|---|
| 1,511,448 A * | 10/1924 | Drum | ............................... | 244/60 |
| 2,974,900 A * | 3/1961 | Morris et al. | ................ | 244/12.4 |
| 3,106,369 A | 10/1963 | Borst | | |
| 3,284,027 A * | 11/1966 | Mesniere | ..................... | 244/12.4 |
| 3,360,217 A * | 12/1967 | Trotter | ......................... | 244/12.4 |
| 4,979,698 A | 12/1990 | Lederman | | |
| 5,031,858 A | 7/1991 | Schellhase et al. | | |
| 5,054,716 A * | 10/1991 | Wilson | ............................. | 244/56 |
| 5,642,982 A * | 7/1997 | Matuska et al. | ................ | 416/87 |
| 5,823,470 A * | 10/1998 | Craig et al. | .................... | 244/7 R |
| 5,839,691 A * | 11/1998 | Lariviere | ....................... | 244/7 R |
| 6,030,177 A * | 2/2000 | Hager | ............................. | 416/87 |
| 6,260,793 B1 * | 7/2001 | Balayn et al. | ................ | 244/7 R |
| 6,260,799 B1 * | 7/2001 | Russ | ............................... | 244/49 |
| 6,276,633 B1 * | 8/2001 | Balayn et al. | ................... | 244/56 |
| 6,328,256 B1 * | 12/2001 | Ryan et al. | ..................... | 244/7 R |

FOREIGN PATENT DOCUMENTS
FR    1282421    1/1962

OTHER PUBLICATIONS

Supplementary European Search Report in EP counterpart application No. 04821772, issued by European Patent Office, Jun. 23, 2010.

* cited by examiner

*Primary Examiner* — Tien Dinh
*Assistant Examiner* — Philip J Bonzell
(74) *Attorney, Agent, or Firm* — James E. Walton

(57) ABSTRACT

A tiltrotor aircraft having a wing and a rotatable pylon carried by the wing is disclosed. The pylon is secured to a pylon support spindle that extends into the wing. A link connects a radial portion of the pylon support spindle to a radial portion of an actuator spindle, such that the pylon support spindle is rotated as the actuator spindle is rotated.

11 Claims, 7 Drawing Sheets

US 7,913,947 B2

COMPACT TILTROTOR PYLON-CONVERSION ACTUATION SYSTEM

TECHNICAL FIELD

The present invention relates to tiltrotor aircraft. In particular, the present invention relates to compact pylon-conversion actuation system for a tiltrotor aircraft.

DESCRIPTION OF THE PRIOR ART

Tiltrotor aircraft are hybrids between traditional helicopters and traditional propeller driven aircraft. Typical tiltrotor aircraft have rotor systems that are capable of articulating relative to the aircraft fuselage. This articulating portion is referred to as a nacelle. Tiltrotor aircraft are capable of converting from a helicopter mode, in which the aircraft can take-off, hover, and land like a helicopter; to an airplane mode, in which the aircraft can fly forward like a fixed-wing airplane.

The design of tiltrotor aircraft poses unique problems not associated with either helicopters or propeller driven aircraft. In particular, the tiltrotor assemblies must be articulated between helicopter mode and airplane mode. To convert between helicopter mode and airplane mode the nacelle must rotate relative to the fuselage.

It is known in the art to use linear actuators, such as screw jacks or hydraulic jacks, to rotate the nacelle about a rotation point relative to the fuselage. Linear actuators tend to be bulky and extend outside the envelope of the wing or nacelle requiring fairings that extend beyond the preferred aerodynamic shape of the wing or nacelle. Another disadvantage when using linear actuators is that very high torque is required at the extremes of the systems movement. Most linear actuators have constant torque throughout the range of motion, but are arranged so that they have the least mechanical advantage at the extremes of the range of motion. Therefore, the linear actuator is larger than it needs to be for the majority of the range of motion so that it can be of sufficient size at the extremes.

Although there have been significant developments in the area of tiltrotor conversion actuation systems, considerable shortcomings remain.

SUMMARY OF THE INVENTION

There is a need for tiltrotor pylon-conversion actuation system that can provide the necessary torque at the extremes of the range of motion while also being compact.

Therefore, it is an object of the present invention to provide a tiltrotor pylon-conversion actuation system that can provide the necessary torque at the extremes of the range of motion while also being compact.

This object is achieved by providing an actuator drive and link assembly to rotate the pylon, or nacelle, over the limited range of motion needed to convert a tiltrotor aircraft from airplane mode to helicopter mode, and vice versa. The pylon rotates about a pylon support spindle while an actuator drive drives an actuator spindle parallel to the pylon support spindle. The pylon support spindle is connected to the actuator spindle by a solid link. The difference in diameter of the spindles provides an increase in torque at the extremes of the range of motion and the solid link provides a limit on the range of motion.

The present invention provides significant advantages, including: (1) providing a compact drive system that can be housed completely within the wing structure; (2) increased mechanical advantage at the extremes of the range of motion to match that closely match the needs of the application; (3) a rigid limit on the range of motion to prevent over-extension under severe conditions; and (4) rigid support to hold the pylon in whatever position the system has moved the pylon into.

Additional objectives, features, and advantages will be apparent in the written description that follows.

BRIEF DESCRIPTION OF THE DRAWINGS

The novel features believed characteristic of the invention are set forth in the appended claims. However, the invention itself, as well as, a preferred mode of use, and further objectives and advantages thereof, will best be understood by reference to the following detailed description when read in conjunction with the accompanying drawings, wherein:

DESCRIPTION OF THE PREFERRED EMBODIMENT

The present invention represents the discovery that a specific actuator system may be used to provide several benefits in rotating the pylon of a tiltrotor aircraft from airplane mode to helicopter mode. The actuator system according to the present invention is particularly useful in applications in which a compact system is needed to maintain the aerodynamic shape of the wing and pylon.

Figure 1:
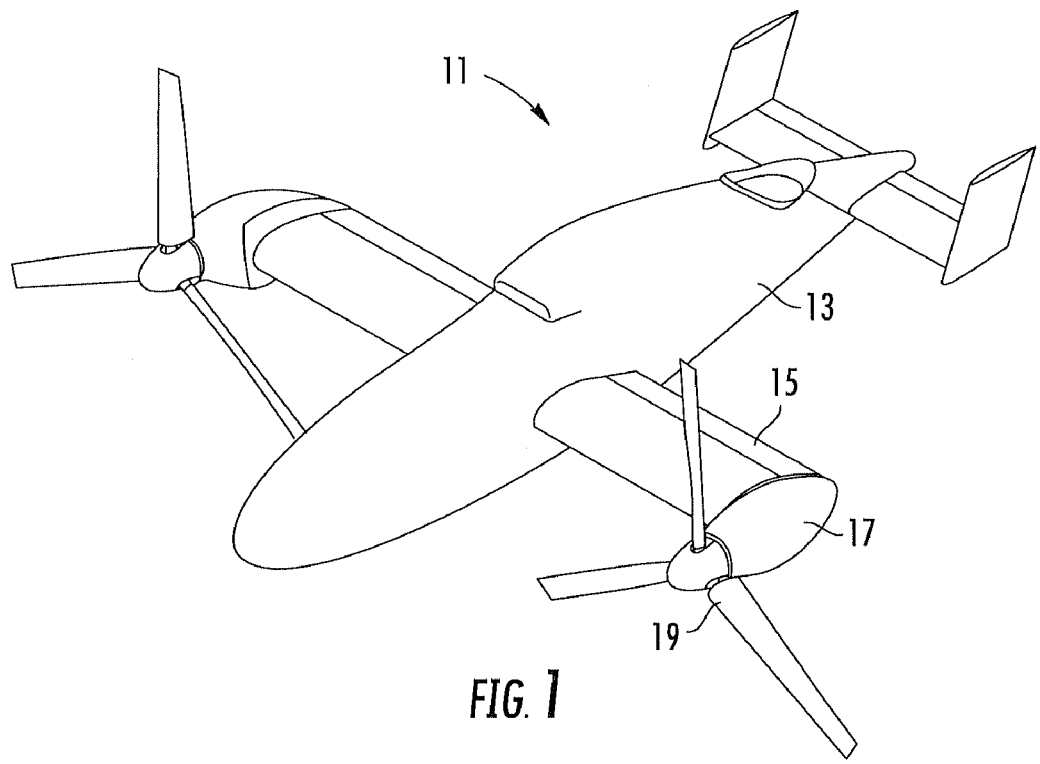
FIG. 1 is a perspective view of a tiltrotor aircraft in airplane mode.

Referring to FIG. 1 of the drawings, a tiltrotor aircraft 11 is shown in airplane mode. In particular, aircraft 11 shown in FIG. 1 is an unmanned aerial vehicle (UAV), as opposed to manned vehicles, and therefore has no provision for onboard human pilots. The invention is not limited to UAVs and may be used on manned vehicles as well. Aircraft 11 has a fuselage 13 with wings 15 extending from the fuselage 13. At the ends of wings 15 are pylons 17, which rotate on the ends of wings 15 through a range of from about 90° of rotation up to about 100° of rotation. In a UAV such as aircraft 11, pylons 17 provide a rotatable support for rotors 19, and the engine used to power rotors 19 is located within the fuselage. In larger tiltrotor aircraft, such as a manned tiltrotor, engines may be located in pylons 17. When configured in airplane mode the plane of each rotor 19 is generally vertical and each pylon 17 is generally horizontal. While aircraft 11 is shown with pylons located at the ends of wings 15, other configurations may be used, such as a configuration in which the pylons are rotatably connected to the fuselage.

Figure 2:
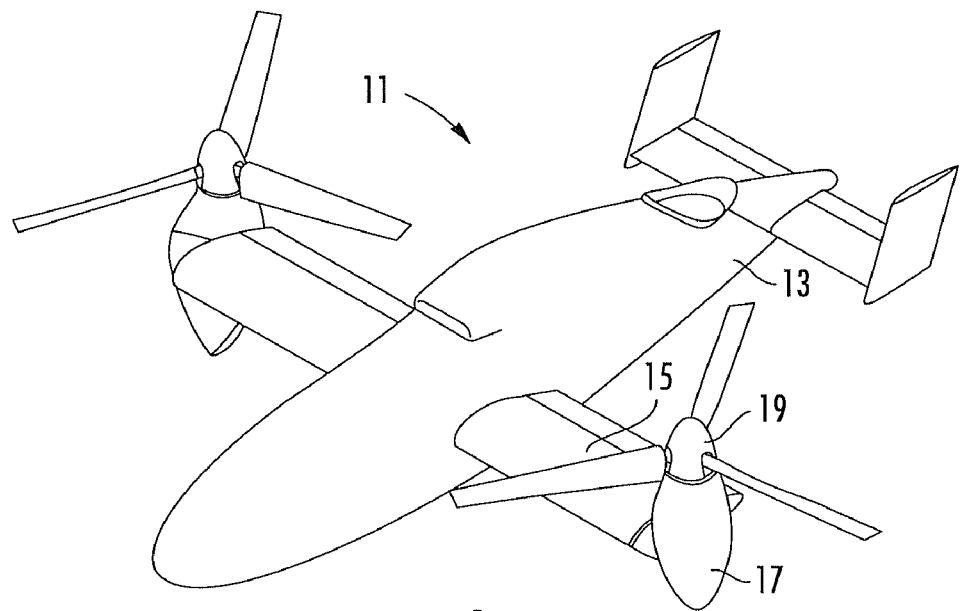
FIG. 2 is a perspective view of a tiltrotor aircraft in helicopter mode.

Referring now to FIG. 2 of the drawings, tiltrotor aircraft 11 is shown in helicopter mode. In helicopter mode the plane of each rotor 19 is generally horizontal and each pylon 17 is generally vertical.

Figure 3:
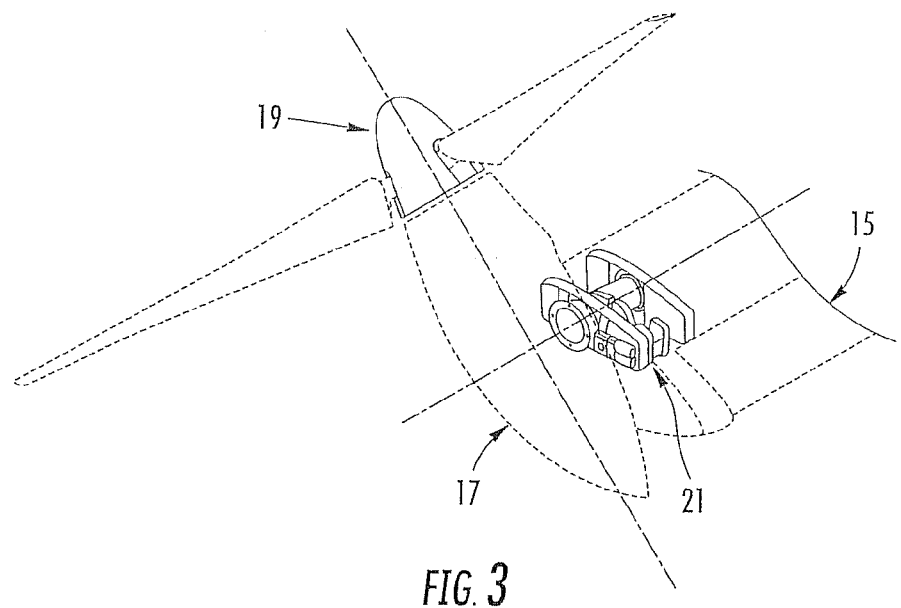
FIG. 3 is a partial cutaway view of the end of a left wing of a tiltrotor aircraft incorporating an embodiment of a pylon-conversion actuation system according to the present invention, system being shown in conversion mode.

Referring now to FIG. 3 of the drawings, the pylon end of a left wing 15 is shown in partial cutaway view. Wing 15 is shown with pylon-conversion actuation system 21 exposed, and pylon 17 is shown in phantom. Pylon 17 is in conversion mode, in other words, between helicopter mode and airplane mode.

Figure 4:
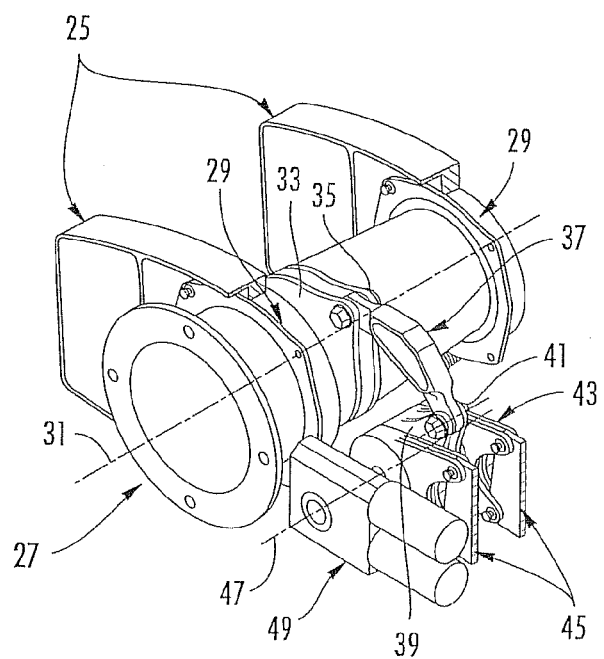
FIG. 4 is an enlarged cutaway view of the actuation system of FIG. 3 in conversion mode.

Referring now to FIG. 4 of the drawings, the pylon end of left wing 15 of FIG. 3 is shown in cutaway view with actuation system 21 in conversion mode. Wing 15 is structurally comprised of skin 23 (shown in FIGS. 5 through 7) and structural ribs 25 (partially removed in FIG. 4 for clarity). Pylon support spindle 27 extends from the end of wing 15 through two ribs 25. Where the support spindle 27 passes through ribs 25 bearing housings 29 support spindle 27 and allow for axial rotation of spindle 27 about spindle axis 31. Spindle bracket 33 is on the outer circumference of support spindle 27 and provides a spindle connection point 35 for link 37. Link 37 is pivotally mounted to spindle bracket 33 at spindle connection point 35. Link 37 is a rigid, curved member, the curve allowing for a slight increase in range of motion than would be available if a straight member was used. A taller bracket 33 would allow use of a straighter link 37 at the cost of compactness.

Link 37 is pivotally mounted to bracket 33 at one end of link 37 with the opposite end of link 37 being pivotally mounted to actuator spindle 39 at actuator connection point 41. Actuator spindle 39 is supported by actuator bearings 43 on either side of actuator spindle 39. Actuator bearings 43 are supported by actuator support 45 (partially sectioned in FIG. 4). Actuator support 45 and actuator bearings 43 support actuator spindle 39 and allow actuator spindle 39 to rotate about actuator axis 47, which is parallel to spindle axis 31. Actuator spindle 39 is driven by electric actuator drive 49 to rotate about actuator axis 47, though a wide variety of types of actuator drives 49 may be used, including drives 49 using hydraulic power or electric motors.

Figure 5:
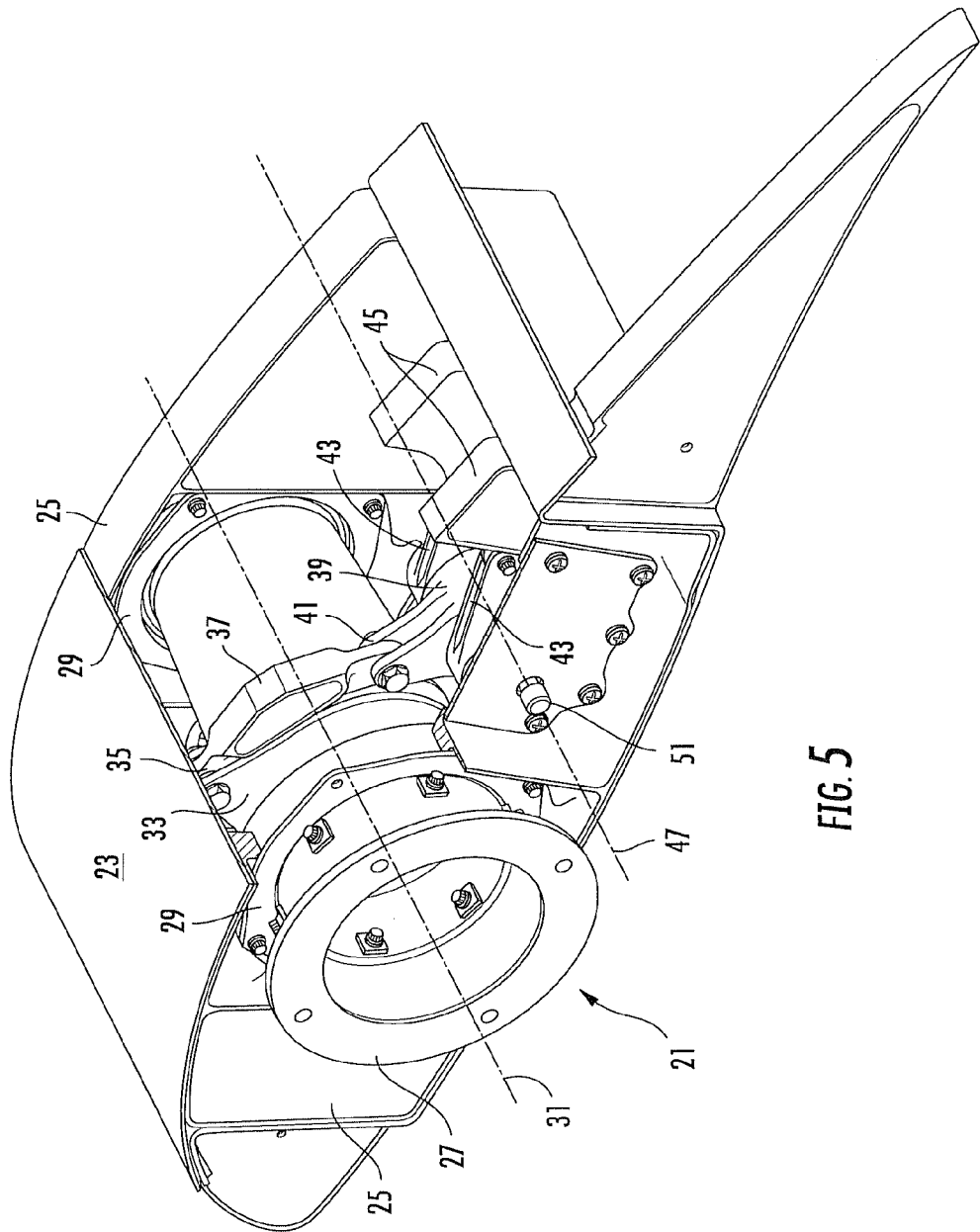
FIG. 5 is an enlarged cutaway view of the actuation system of FIG. 3 in airplane mode.

Referring now to FIG. 5 of the drawings, the pylon end of left wing 15 is shown in cutaway view with actuation system 21 in airplane mode and actuator drive 49 removed. Input shaft 51 is shown extending from actuator spindle 39 through rib 25 to connect with actuator drive 49 (not shown in FIG. 5). Actuator drive 49 applies torque to input shaft 51, which is connected to actuator spindle 39 through a gear-reduction system (not shown), such as a planetary-gear system. This gear system multiplies the amount of output torque from actuator drive 49 and permits use of a smaller, lower-torque actuator drive 49. For example, a gear system may provide for a 50:1 ratio of revolutions of shaft 51 to revolutions of actuator spindle 39.

In the embodiment shown input shaft 51 extends through the last rib 25 of wing 15 towards pylon 17. This allows the actuator drive 49 to be easily accessed when pylon 17 is removed. Alternatively, input shaft 51 may extend into wing 15, away from pylon 17, allowing actuator drive 49 to be accessed by removing a portion of skin 23.

Continuing with FIG. 5 of the drawings, the actuation system 21 is shown in airplane mode. Actuator spindle 39 is rotated forward (counter-clockwise as shown from the end of left wing 15) such that link 37 is generally adjacent the circumference of spindle 27 and spindle 27 is rotated forward such that pylon 17 is in airplane mode.

Figure 6:
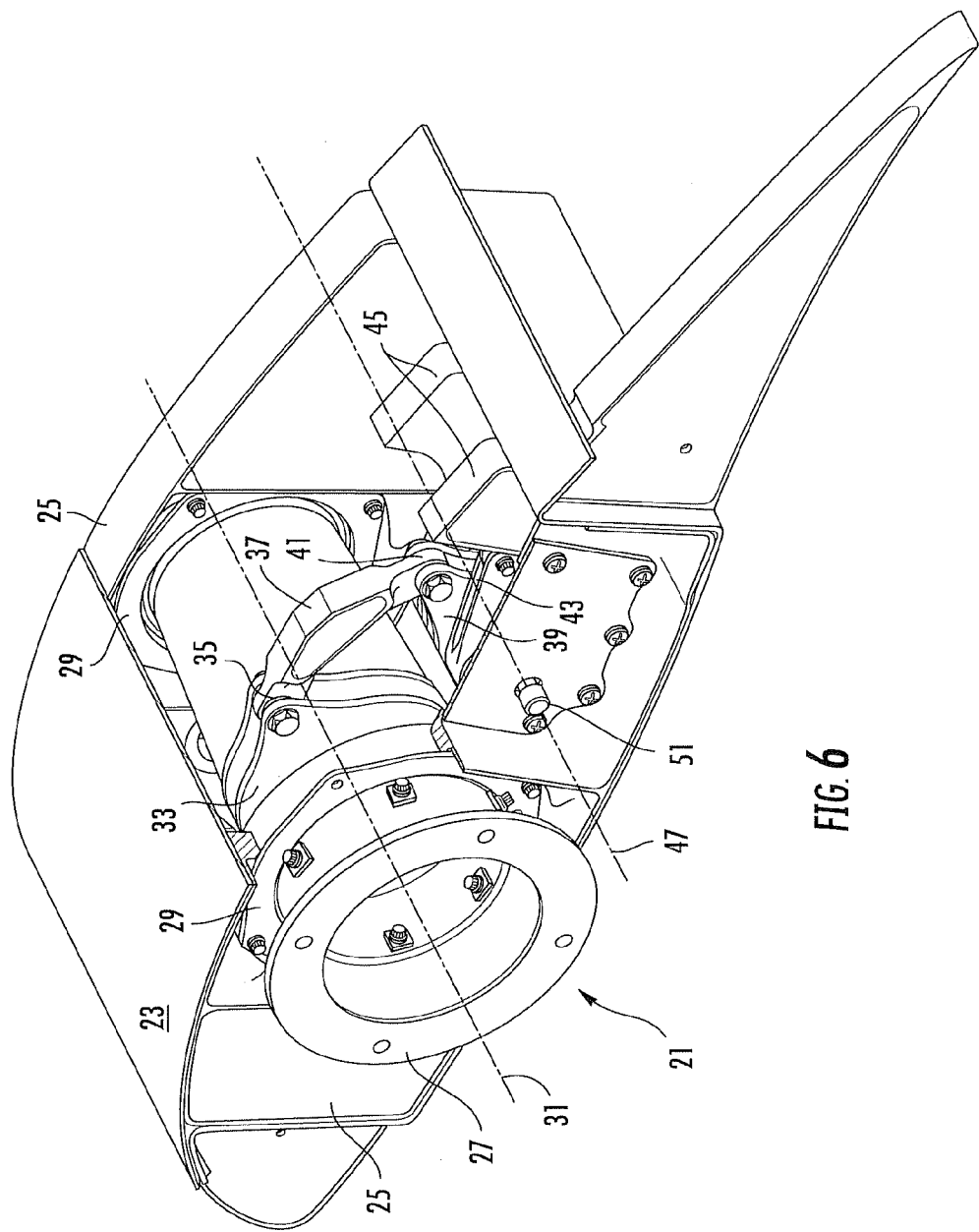
FIG. 6 is an enlarged cutaway view of the actuation system of FIG. 3 in conversion mode.

Referring now to FIG. 6 of the drawings, a cutaway view of the pylon end of left wing 15 shows actuation system 21 in conversion mode, which is any position between the airplane mode and helicopter mode positions. In order to move from the airplane mode shown in FIG. 5 to the conversion mode shown in FIG. 6, actuator drive 49 applies a torque to input shaft 51 to rotate actuator spindle 39 backward (clockwise as shown from the end of left wing 15) about actuator axis 47. This puts link 37 in tension and thereby creates a torque on pylon support spindle 27, rotating pylon support spindle 27 backward (clockwise as shown from the end of left wing 15) about spindle axis 31 to put pylon 17 into conversion mode.

Figure 7:
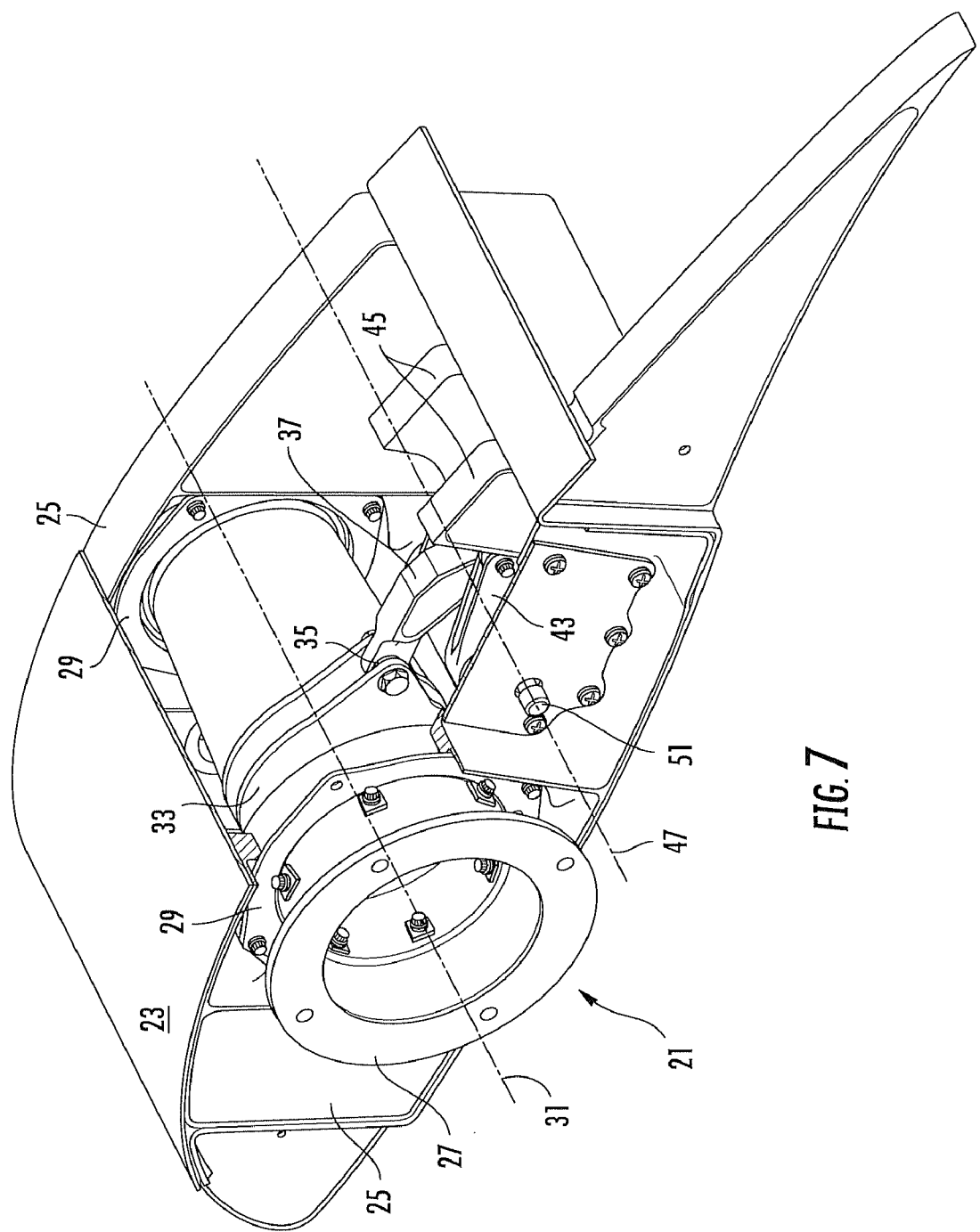
FIG. 7 is an enlarged cutaway view of the actuation system of FIG. 3 in helicopter mode.

Referring now to FIG. 7 of the drawings, a cutaway view of the pylon end of left wing 15 shows actuation system 21 in helicopter mode. In order to move from the conversion mode shown in FIG. 6 to the helicopter mode shown in FIG. 7, actuator drive 49 applies a torque to input shaft 51 to rotate actuator spindle 39 further backward (clockwise as shown from the end of left wing 15) about actuator axis 47. This puts link 37 in tension and thereby creates a torque on pylon support spindle 27 to rotate the pylon support spindle 27 further backward (clockwise as shown from the end of left wing 15) about spindle axis 31 to put pylon 17 into helicopter mode.

Figure 8A:
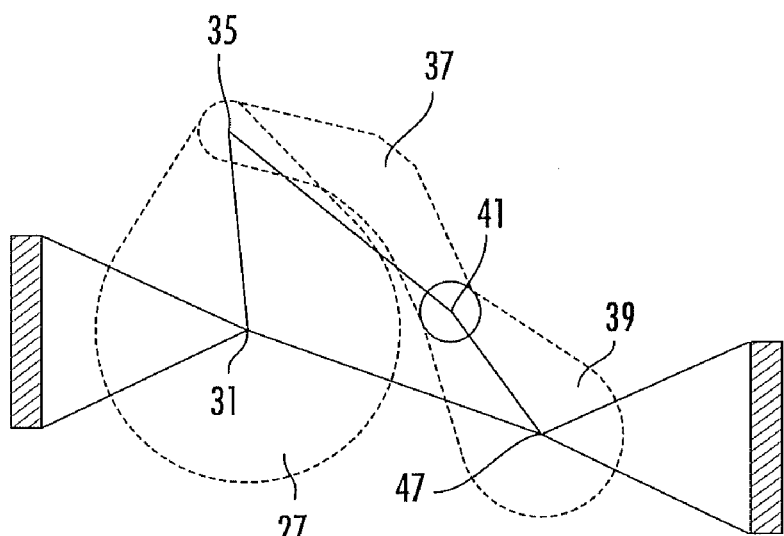
FIG. 8A is a schematic view of the system linkage as shown in FIG. 5, in airplane mode.
Figure 8B:
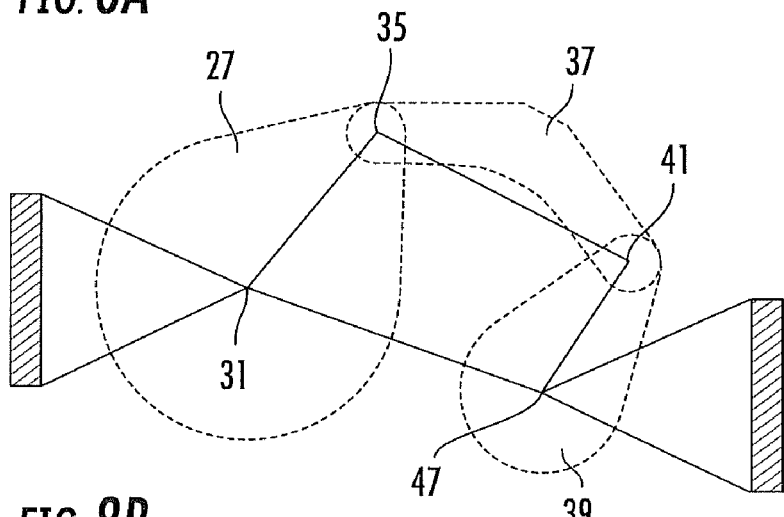
FIG. 8B is a schematic view of the system linkage as shown in FIG. 6, in conversion mode.
Figure 8C:
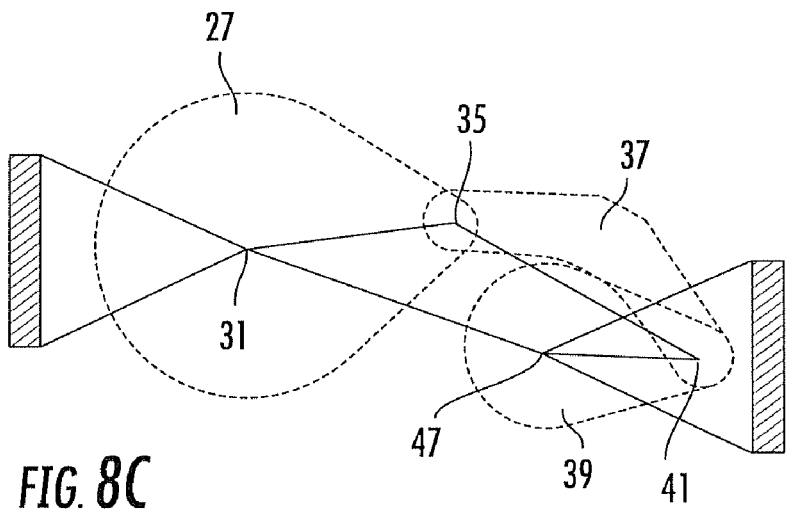
FIG. 8C is a schematic view of the system linkage as shown in FIG. 7, in helicopter mode.

Referring now to FIGS. 8A, 8B, and 8C of the drawings, each is a schematic of the linkage of pylon-conversion actuation system 21. The schematics are in the plane normal to spindle axis 31 and actuator axis 47, spindle axis 31 and actuator axis 47 being parallel, as described above. Therefore, spindle axis 31 and actuator axis 47 are represented as points in FIGS. 8A, 8B, and 8C. Also, spindle connection point 35 and actuator connection point 41 are shown as points at either end of link 37 as described above. Actuator spindle 39 rotates about actuator axis 47 and pylon support spindle 27 rotates about spindle axis 31. Actuator connection point 41 rotates about actuator axis 47 and spindle connection point 35 rotates about spindle axis 31. Link 37 maintains a fixed distance between spindle connection point 35 and actuator connection point 41, thereby causing spindle connection point to rotate in reaction to the rotation of actuator connection point 41, as shown in FIGS. 8A, 8B, and 8C.

FIG. 8A is a schematic of the linkage of actuation system 21 in airplane mode. Actuator spindle 39 is rotated counter-clockwise until link 37 has pushed pylon support spindle 27 to rotate counter-clockwise into airplane mode.

FIG. 8B is a schematic of the linkage of actuation system 21 in conversion mode. Actuator spindle 39 is rotating and link 37 is causing spindle 27 to rotate in the same direction as actuator spindle 39. As compared to FIG. 8A, actuator spindle 39 has rotated clockwise, thereby causing spindle 27 to rotate clockwise toward helicopter mode. As compared to FIG. 8C, actuator spindle 39 has rotated counter-clockwise, thereby causing spindle 27 to rotate counter-clockwise toward airplane mode.

FIG. 8C is a schematic of the linkage of actuation system 21 in conversion mode. Actuator spindle 39 is rotated clockwise until link 37 has pulled pylon support spindle 27 to rotate clockwise into helicopter mode.

It is important to note that all of the detail drawings of pylon-conversion actuation system 21 have been of actuation system 21 as deployed on left wing 15 of aircraft 11. It is to be understood that actuation system 21 is equally adapted for placement on right wing 15 of aircraft 11 and that actuation system 21 on right wing 15 would be a mirror image of actuation system 21 on left wing 15, and the direction of rotation needed to move actuation system 21 between the various modes would be the opposite of that discussed herein.

Figure 9:
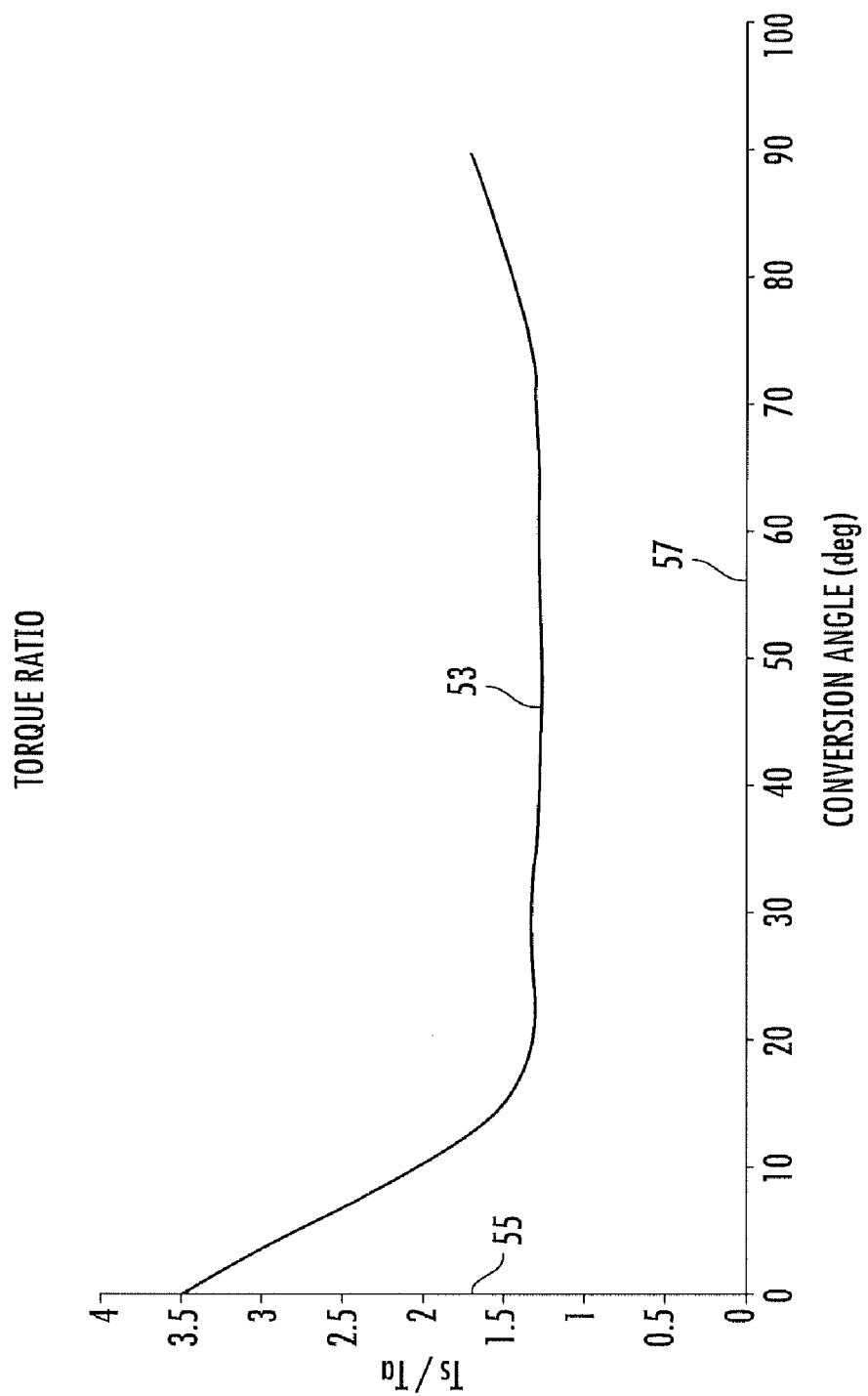
FIG. 9 is a graph of the torque advantage of the actuation system of FIG. 3.

Referring now to FIG. 9 of the drawings, the graph shows a torque ratio curve 53 for the embodiment shown in FIGS. 3 through 8C. The torque ratio curve 53 is plotted with the torque ratio on the y-axis 55 and the conversion angle on the x-axis 57. The torque ratio is the torque applied to pylon support spindle 27 divided by the torque applied to actuator spindle 39. Therefore, a torque ratio value greater than 1.0 indicates a positive mechanical advantage in the system. The conversion angle is the relative position of pylon support spindle 27. A conversion angle of "0" indicates that pylon 17 is in airplane mode, whereas a conversion angle of "90" indicates that pylon 17 is in helicopter mode. Torque ratio curve 53 clearly shows that the above embodiment provides a mechanical advantage over the full range of motion, and this advantage is related to the ratio of the larger diameter of pylon support spindle 27 to the smaller diameter of actuator spindle 39. More importantly, the torque ratio increases at the extremes of the range of motion, i.e., near 0 degrees and near 90 degrees, and this increase in torque ratio shows an increase in mechanical advantage where it is needed most.

As described above, pylons 17 may be rotatably attached to aircraft 11 at locations other than at the ends of wings 15. For example, a pylon may be attached to the fuselage or may be located in an inboard portion of wing 15. Also, while link 37 is shown as a rigid, rod-like member, other types of linking means, such as a belt or chain, may be used to link actuator spindle 39 to pylon support spindle 27.

It is apparent that an invention with significant advantages has been described and illustrated. Although the present invention is shown in a limited number of forms, it is not limited to just these forms, but is amenable to various changes and modifications without departing from the spirit thereof.

The invention claimed is:

1. A tiltrotor aircraft, comprising:
   a wing;
   a rotatable pylon carried by the wing, the pylon being secured to a pylon support spindle that extends into the wing, the pylon support spindle being rotatable about a spindle axis;
   an actuator drive for driving an actuator spindle, the actuator spindle being rotatable about an actuator axis;
   a pivoting link connecting a radial portion of the actuator spindle to a radial portion of the pylon support spindle, such that the pylon support spindle is rotated as the actuator spindle is rotated, the link being pivotally connected to the radial portion of the actuator spindle at an actuator connection point, the link also being pivotally connected to the radial portion of the pylon support spindle at a spindle connection point;
   a first length being the distance between the spindle axis and the spindle connection point;
   a second length being the distance between the actuator axis and the actuator connection point;
   wherein the first length is greater than the second length so as to provide an increased torque when the rotatable pylon is rotated near extreme ranges of motion;
   wherein a first direction of rotation of the actuator spindle causes the link to push the radial portion of the pylon support spindle, thereby causing the pylon support spindle to also rotate in the first direction of rotation; and
   wherein a second direction of rotation of the actuator spindle causes the link to pull the radial portion of the pylon support spindle, thereby causing the pylon support spindle to also rotate in the second direction of rotation.

2. The tiltrotor aircraft according to claim 1, wherein the pivoting link is curved.

3. The tiltrotor aircraft according to claim 1, wherein the radial portion of the pylon support spindle is a bracket attached to the pylon support spindle, the link being pivotally connected to the bracket.

4. The tiltrotor aircraft according to claim 1, wherein the spindle axis and the actuator axis are generally parallel.

5. A tiltrotor aircraft, comprising:
   at least one wing;
   a pylon carried by the at least one wing, the pylon secured to a pylon support spindle that extends into the at least one wing, the pylon support spindle being rotatable about a spindle axis;
   an actuator spindle located within the wing, the actuator spindle being rotatable about an actuator axis;
   a link having a first end and a second end, the first end pivotally attached to a radial portion of the pylon support spindle at a spindle connection point, the second end pivotally attached to a radial portion of the actuator spindle at an actuator connection point;
   a first length being the distance between the spindle axis and the spindle connection point;
   a second length being the distance between the actuator axis and the actuator connection point;
   wherein a first direction of rotation of the actuator spindle pushes the link, thereby applying torque to the pylon support spindle, so as to position the pylon in an airplane mode;
   wherein a second direction of rotation of the actuator spindle pulls the link, thereby applying torque to the pylon support spindle, so as to position the pylon in a helicopter mode; and
   wherein the first length is greater than the second length so that a torque ratio increases when the pylon approaches the airplane mode, as well as when the pylon approaches the helicopter mode, the torque ratio being the ratio of the torque applied to the pylon support spindle divided by the torque applied to the actuator spindle.

6. The tiltrotor aircraft according to claim 5, wherein the link is curved.

7. The tiltrotor aircraft according to claim 5, wherein the radial portion of the pylon support spindle is a bracket attached to the pylon support spindle, the link being pivotally attached to the bracket.

8. The tiltrotor aircraft according to claim 5, further comprising:
   an actuator drive attached to the actuator spindle for applying torque to the actuator spindle.

9. The tiltrotor aircraft according to claim 5, wherein the spindle axis and the actuator axis are generally parallel.

10. A method for rotating a pylon on a tiltrotor aircraft, wherein the pylon is rigidly attached to a pylon support spindle, the method comprising the steps of:
    selectively rotating an actuator spindle; and
    rotating the pylon support spindle using a pivoting link connecting the actuator spindle to the pylon support spindle, the actuator spindle being selectively rotated for positioning the pylon in a desired angular orientation, the link being pivotally connected between a radial portion of the actuator spindle and a radial portion of the pylon support spindle, the link being pivotally connected to the radial portion of the actuator spindle at an actuator connection point, the link also being pivotally connected to the radial portion of the pylon support spindle at a spindle connection point;

selectively rotating the actuator spindle in a first direction of rotation so as to cause the link to push the radial portion of the pylon support spindle, thereby causing the pylon support spindle to also rotate in the first direction of rotation;

selectively rotating the actuator spindle in a second direction of rotation so as to cause the link to pull the radial portion of the pylon support spindle, thereby causing the pylon support spindle to also rotate in the second direction of rotation;

wherein a first length, the first length being the distance between the spindle axis and the spindle connection point, is greater than a second length, the second length being the distance between the actuator axis and the actuator connection point, so as to provide an increased torque when the rotatable pylon is rotated near extreme ranges of motion.

11. An actuation system for a pylon on a tiltrotor aircraft, the system comprising:

a pylon support spindle for rigidly supporting the pylon, the pylon support spindle being rotatable about a spindle axis;

an actuator spindle being rotatable about an actuator axis; and a pivoting link pivotally connecting a radial portion of the pylon support spindle to a radial portion of the actuator spindle, such that rotation of the actuator spindle produces rotation of the pylon support spindle, the link being pivotally connected to the radial portion of the actuator spindle at an actuator connection point, the link also being pivotally connected to the radial portion of the pylon support spindle at a spindle connection point;

a first length being the distance between the spindle axis and the spindle connection point;

a second length being the distance between the actuator axis and the actuator connection point;

wherein the first length is greater than the second length so as to provide an increased torque when the rotatable pylon is rotated near extreme ranges of motion;

wherein a first direction of rotation of the actuator spindle causes the link to push the radial portion of the pylon support spindle, thereby causing the pylon support spindle to also rotate in the first direction of rotation; and wherein a second direction of rotation of the actuator spindle causes the link to pull the radial portion of the pylon support spindle, thereby causing the pylon support spindle to also rotate in the second direction of rotation.

* * * * *